(12) United States Patent
Gutierrez

(10) Patent No.: US 7,866,336 B1
(45) Date of Patent: Jan. 11, 2011

(54) MECHANICAL EMERGENCY LIQUID SHUT-OFF DEVICE

(76) Inventor: Luis Gutierrez, 530 Beach 65th St., Arverne, NY (US) 11692

( * ) Notice: Subject to any disclaimer, the term of this patent is extended or adjusted under 35 U.S.C. 154(b) by 294 days.

(21) Appl. No.: 12/283,577

(22) Filed: Sep. 12, 2008

(51) Int. Cl.
*F16K 13/08* (2006.01)
*F16K 17/36* (2006.01)

(52) U.S. Cl. .................. 137/312; 137/67; 137/68.11
(58) Field of Classification Search ............ 137/312, 137/67, 68.11, 15.11; 122/504, 507
See application file for complete search history.

(56) References Cited

U.S. PATENT DOCUMENTS

| | | | |
|---|---|---|---|
| 2,729,827 A | | 1/1956 | Morita |
| 2,798,503 A | * | 7/1957 | Carver et al. .................. 137/67 |
| 3,920,031 A | * | 11/1975 | Maxfield ...................... 137/67 |
| 4,153,846 A | | 5/1979 | Watterback |
| 4,381,710 A | | 5/1983 | Watterback |
| 4,402,093 A | | 9/1983 | Luker et al. |
| 4,633,534 A | | 1/1987 | Hardman |
| 4,696,319 A | | 9/1987 | Gant |
| 6,024,116 A | * | 2/2000 | Almberg et al. ............. 137/312 |
| 6,058,519 A | | 5/2000 | Quintana |
| 6,206,337 B1 | * | 3/2001 | Veillet, Jr. .................. 137/78.1 |
| 6,543,471 B1 | * | 4/2003 | Carroll ........................ 137/312 |
| 6,779,203 B1 | | 8/2004 | Quillen |
| 7,155,752 B2 | | 1/2007 | Feda |
| 7,424,896 B1 | * | 9/2008 | Martin et al. ............... 137/312 |
| 7,562,673 B1 | * | 7/2009 | Martin et al. ............... 137/312 |
| 7,703,476 B1 | * | 4/2010 | Carroll ........................ 137/312 |

* cited by examiner

*Primary Examiner*—Kevin L Lee
(74) *Attorney, Agent, or Firm*—Richard L. Miller

(57) ABSTRACT

A mechanical emergency liquid shut-off device which comprises a liquid sensing unit placed upon a floor of a room. A pair of pulley assemblies are mounted in a spaced apart relationship to a ceiling of the room. A liquid flow pipe having a shut-off valve is located within the ceiling of the room. A spool has a shaft rotatably connected to the shut-off valve in the liquid flow pipe. A first cable has a first end coupled to the liquid sensing unit, wherein the first cable extends through the pulley assemblies. A second cable has a first end wound upon the spool, wherein the second cable extends through the pulley assemblies. A ballast weight has a second end of the first cable and a second end of the second cable affixed thereto. When the liquid sensing unit detects liquid coming into the room from a leak in the liquid flow pipe, it will allow the first cable to move about the pulley assemblies making the ballast weight drop down and pull the second cable causing the first end of the second cable on the spool to unwind rotating the spool and the shaft, thereby closing the shut-off valve and stopping the liquid leak in the liquid flow pipe.

5 Claims, 3 Drawing Sheets

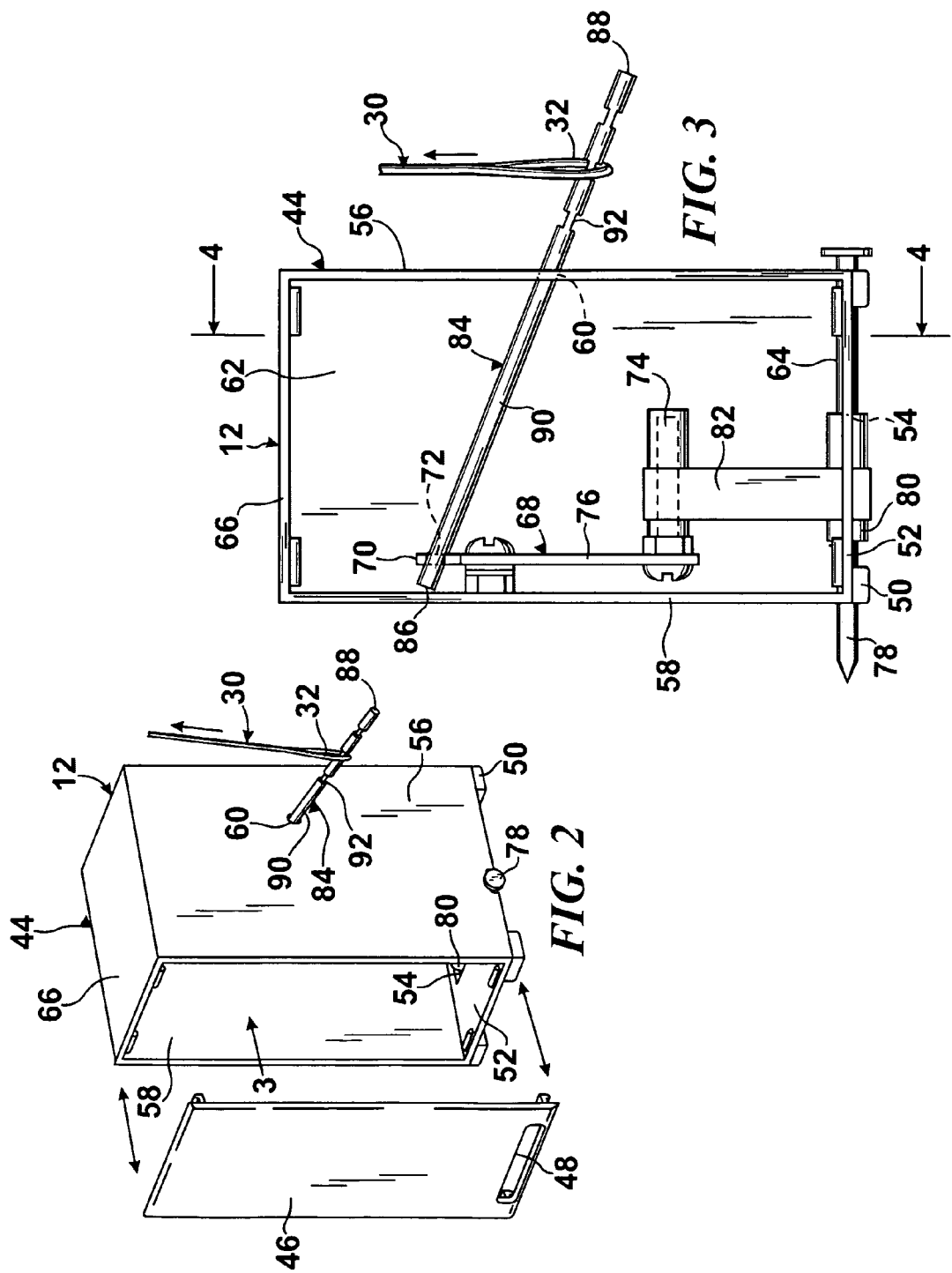

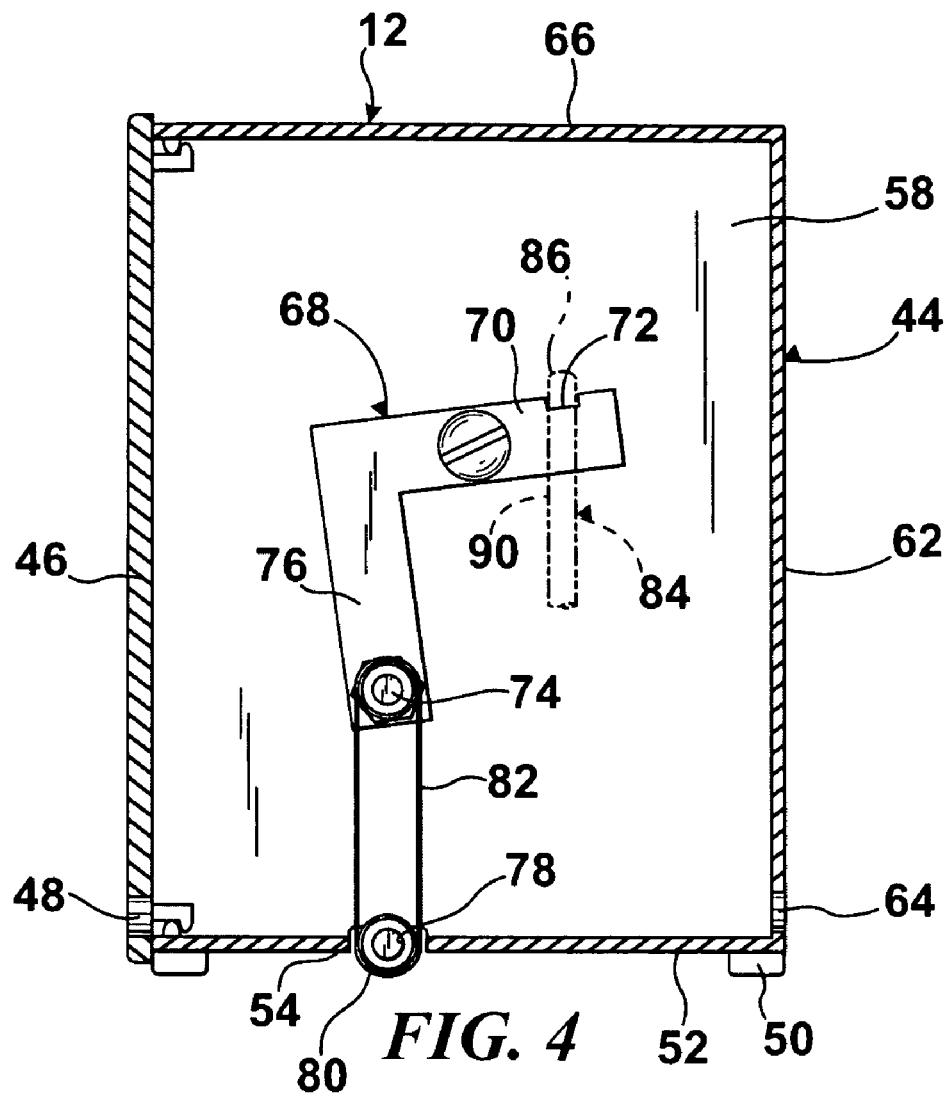
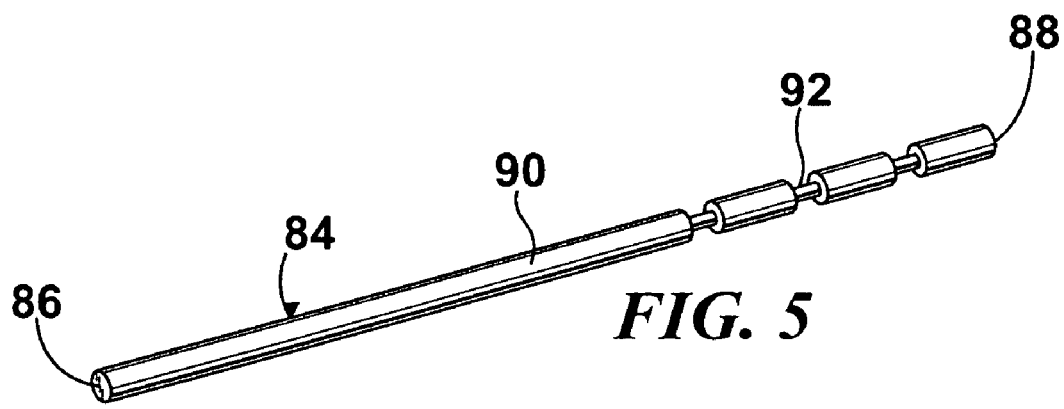

MECHANICAL EMERGENCY LIQUID SHUT-OFF DEVICE

BACKGROUND OF THE INVENTION

1. Field of the Invention

The present invention relates to a shut-off valve, and more particularly, a mechanical emergency liquid shut-off device.

2. Description of the Prior Art

Numerous innovations for liquid shut-off devices have been provided in the prior art that will be described. Even though these innovations may be suitable for the specific individual purposes to which they address, however, they differ from the present invention.

A FIRST EXAMPLE, U.S. Pat. No. 2,729,827, Issued on Jan. 10, 1956, to Morita teaches a flush tank having a drain pipe leading to a toilet bowl, a semi-automatic valve mounted in the tank and manually activated into an open position, and a second semi-automatic valve also mounted in the tank and manually actuated into a closed position, the drain pipe including a common valve seat for both valves, the valves being selectively moved into a closed coaxial position with each other for alternately closing the drain pipe, and independent actuating means for the valve to selectively open one valve and close the other valve.

A SECOND EXAMPLE, U.S. Pat. No. 4,153,846, Issued on May 8, 1979, to Waterback teaches a detector for liquid media that has a swelling body which in the presence of the liquid expands to break open an ampule of electrolyte solution under pressure, enclosed in a rubber sheath together with a dry-charged galvanic element. The electrolyte enters the galvanic element, which starts producing electric current, thereby signalling presence of liquid.

A THIRD EXAMPLE, U.S. Pat. No. 4,381,710, Issued on May 3, 1983, to Waterback teaches a moisture actuated trigger device comprising a housing; a moisture absorbing swelling body in the housing, one end of the body engaging a stationary wall of the housing and the opposite end engaging an end wall of a sleeve slidable within the housing upon expansion of the swelling body; an elongated plunger member in the housing movable between a first, stand-by position and a second, released position; latch means detachably engaging the plunger member for holding in its first, stand-by position; a spring means biasing the plunger member in a direction towards its released position, cam means on the sleeve for disengaging the latch means from the plunger member thereby enabling the latter to rapidly move from its first, stand-by position to its released position; and a shock wave initiating means located in the path of the plunger member and adapted to initiate a shock wave when struck by the plunger member.

A FOURTH EXAMPLE, U.S. Pat. No. 4,402,093, Issued on Sep. 6, 1983, to Luker et al. teaches an emergency valve unit which can be sold as a kit and which can be easily and quickly installed into typical, commercially-available toilets to prevent the bowl of the toilet from overflowing during the flushing thereof. The valve unit has a relatively thin, flat housing which is positioned between the water tank and the stool section of the toilet and is held there by the seam bolts that normally secure the tank to the stool. The housing has an opening therethrough which aligns with and forms a portion of the fluid passage between the tank and the stool. A valve element is slidably mounted in the housing and is manually movable to open or close the opening by means of a rod which extends from the housing. If at any time it appears that the toilet bowl is ready to overflow during a flushing operation, the rod can be pulled to close the valve unit thereby shutting off the flow of water from the tank to the bowl. Once the waste outlet of the bowl has been cleared, the rod is pushed to open the valve unit and routine operation of the toilet is resumed.

A FIFTH EXAMPLE, U.S. Pat. No. 4,633,534, Issued on Jan. 6, 1987, to Hardman teaches a universal shut-off device for stopping the flow of water from a toilet tank to a toilet bowl during the flushing of the toilet. The device is mountable on toilet tanks having a handle on either the right-hand side or the left hand-side of the tank. The device has a stop handle accessible from the exterior of the toilet tank. If the plumbing is partially or completely plugged up and the toilet bowl begins to overflow during flushing, the flow of water into the bowl can immediately be shut off during the flushing operation. This is carried out by turning a stop handle which causes the tank ball to move against the valve seat and stop the flow of water from the toilet tank to the toilet bowl. A bendable and ductile operator arm is shaped by the user to push against the tank ball.

A SIXTH EXAMPLE, U.S. Pat. No. 4,696,319, Issued on Sep. 29, 1987, to Gant teaches a moisture-actuated apparatus for controlling the flow of water by expandingly absorbing moisture from and contractingly emitting moisture into a moisture-conducting medium. The actuation is binary, with one state resulting from the expansion of an actuating element when it absorbs moisture from a water-conducting medium having a higher concentration of moisture than the element. The second state results from the contraction of the actuating element when the medium contains a lower concentration of moisture than the element, causing the element to emit moisture into the medium. The actuating element includes a thirotropic hydrophilic expandite material disposed in a matrix of wicking material. In one embodiment the absorptive expansion is used to provide a high-moisture signal in the same embodiment, contraction of the element produces a low moisture signal for opening the valve. In other embodiments, the expansion and contraction of the actuating element is used to directly actuate a valve.

A SEVENTH EXAMPLE, U.S. Pat. No. 6,058,519, Issued on May 9, 2000, to Quintana teaches a flow control device for a toilet to prevent flooding upon obstructing of a waste outlet of a toilet bowl. The device includes a sensor assembly mounted on a clip held over a rim of the toilet bowl so as to hold the sensor assembly in a predetermined position within the toilet bowl. The clip may include adjustable elements thereon to enable the height of the sensor assembly to be adjusted, depending on the size and type of toilet in which it is affixed. If water bridges contacts on the sensor assembly, an electrical circuit is completed, and a solenoid is actuated to close a normally opened valve to shut off running water to the water tank of the toilet. The present invention is an easily-added-on, simplified device for use with a toilet bowl to prevent flooding, if the waste outlet of the toilet bowl is blocked for any reason.

AN EIGHTH EXAMPLE, U.S. Pat. No. 6,779,203, Issued on Aug. 24, 2004, to Quillen teaches an emergency toilet shutoff assembly for shutting off flow of water into the tank of a toilet. The emergency toilet shutoff assembly includes a toilet assembly including a tank having side walls, and also including a float support member being disposed in the tank, and further including a float member being supported upon the float support member, and also including a pair of water conduits being disposed in the tank for filling the tank with water; and also includes a valve assembly being connected to the water conduits for shutting off flow of water into the tank A NINTH EXAMPLE, U.S. Pat. No. 7,155,752, Issued on Jan. 2, 2007, to Feda teaches a control mechanism for preventing overflow of a toilet including a bowl, a water tank, and a filler float operatively communicating with a filler valve includes a knob or handle that can be manipulated to cause the filler float to occupy a position that shuts off the filler valve. The control mechanism includes a filler float guide member having a low guide section separated from a high guide section by a ramped section. By manipulating the knob or handle of the control mechanism, the filler float is forced up the ramp section to the high guide section, shutting off the filler valve.

It is apparent now that numerous innovations for liquid shut-off devices have been provided in the prior art that are adequate for various purposes. Furthermore, even though these innovations may be suitable for the specific individual purposes to which they address, accordingly, they would not be suitable for the purposes of the present invention as heretofore described.

SUMMARY OF THE INVENTION

AN OBJECT of the present invention is to provide a mechanical emergency liquid shut-off device that avoids the disadvantages of the prior art.

ANOTHER OBJECT of the present invention is to provide a mechanical emergency liquid shut-off device that is simple and inexpensive to manufacture.

STILL ANOTHER OBJECT of the present invention is to provide a mechanical emergency liquid shut-off device that is simple to use.

BRIEFLY STATED, STILL YET ANOTHER OBJECT of the present invention is to provide a mechanical emergency liquid shut-off device which comprises a liquid sensing unit placed upon a floor of a room. A pair of pulley assemblies are mounted in a spaced apart relationship to a ceiling of the room. A liquid flow pipe having a shut-off valve is located within the ceiling of the room. A spool has a shaft rotatably connected to the shut-off valve in the liquid flow pipe. A first cable has a first end coupled to the liquid sensing unit, wherein the first cable extends through the pulley assemblies. A second cable has a first end wound upon the spool, wherein the second cable extends through the pulley assemblies. A ballast weight has a second end of the first cable and a second end of the second cable affixed thereto. When the liquid sensing unit detects liquid coming into the room from a leak in the liquid flow pipe, it will allow the first cable to move about the pulley assemblies making the ballast weight drop down and pull the second cable causing the first end of the second cable on the spool to unwind rotating the spool and the shaft, thereby closing the shut-off valve and stopping the liquid leak in the liquid flow pipe.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawings are briefly described as follows:

FIG. 2 is a diagrammatic perspective view of the liquid sensing unit per se of the present invention, with the front cover exploded therefrom;

FIG. 3 is a diagrammatic front elevational view taken in the direction of arrow 3 in FIG. 2 with the front cover removed;

FIG. 4 is a diagrammatic cross-sectional view taken on line 4-4 of FIG. 3 with the front cover installed thereon; and FIG. 5 is a diagrammatic perspective view of the lever arm of the liquid sensing unit.

A MARSHALLING OF REFERENCE NUMERALS UTILIZED IN THE DRAWING

Figure 1:
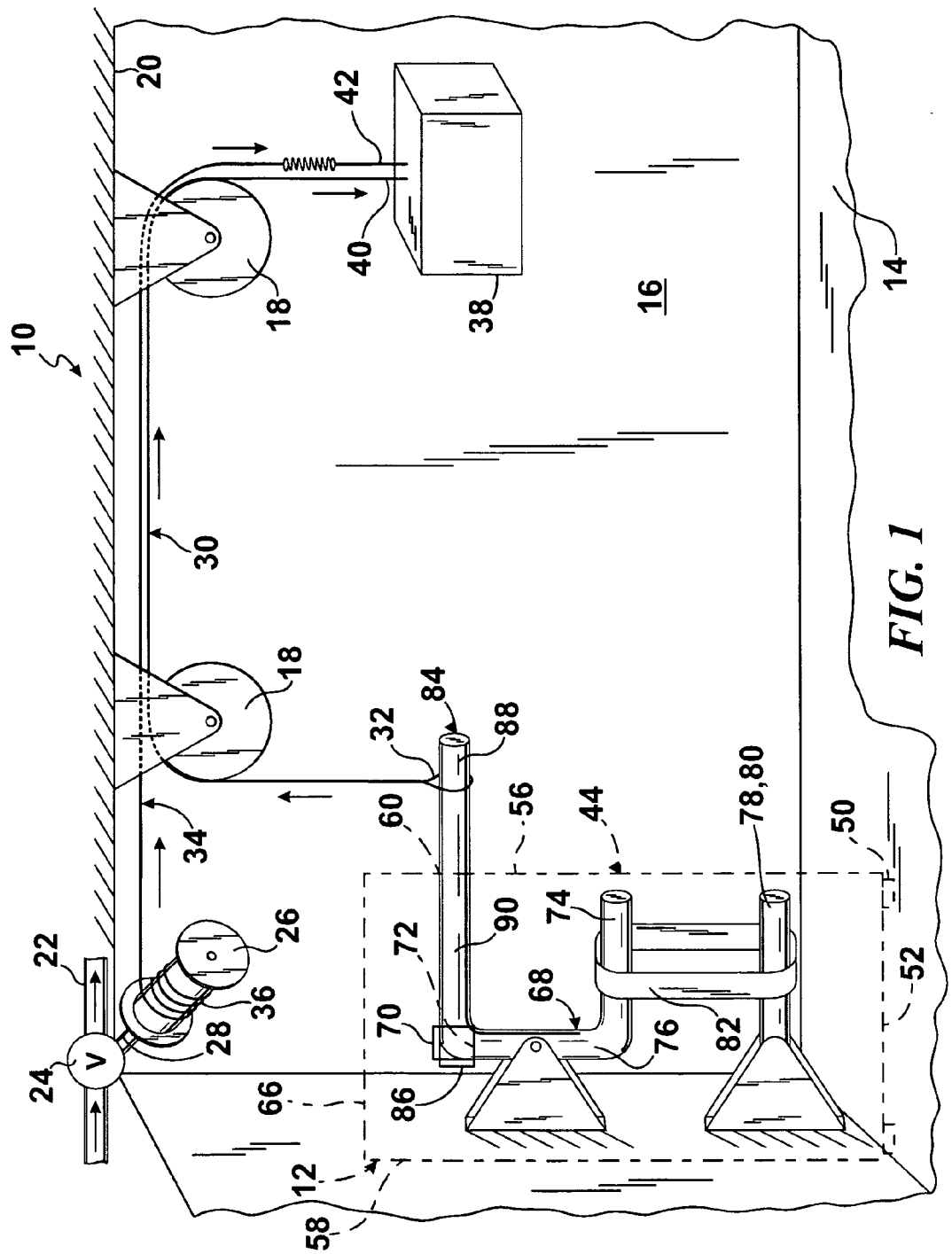
FIG. 1 is a diagrammatic perspective view of an embodiment of the present invention is use illustrating the cooperation among the components.

| | |
|---|---|
| 10 | mechanical emergency liquid shut-off device |
| 12 | liquid sensing unit of shut-off device 10 |
| 14 | floor of room 16 |
| 16 | room |
| 18 | pulley assembly of shut-off device 10 |
| 20 | ceiling of room 16 |
| 22 | liquid flow pipe of shut-off device 10 |
| 24 | shut-off valve in liquid flow pipe 22 |
| 26 | spool of shut-off device 10 |
| 28 | shaft of spool 26 |
| 30 | first cable of shut-off device 10 |
| 32 | first end of first cable 30 |
| 34 | second cable of shut-off device 10 |
| 36 | first end of second cable 34 |
| 38 | ballast weight of shut-off device 10 |
| 40 | second end of first cable 30 |
| 42 | second end of second cable 34 |
| 44 | box-shaped housing of liquid sensing unit 12 |
| 46 | front cover of liquid sensing unit 12 |
| 48 | liquid receiving slot in front cover 46 |
| 50 | foot of box-shaped housing 44 |
| 52 | bottom wall of box-shaped housing 44 |
| 54 | rectangular opening in bottom wall 52 |
| 56 | first side wall of box-shaped housing 44 |
| 58 | second side wall of box-shaped housing 44 |
| 60 | aperture in first side wall 56 |
| 62 | back wall of box-shaped housing 44 |
| 64 | liquid receiving slot in back wall 62 |
| 66 | top wall of box-shaped housing 44 |
| 68 | L-shaped pivot member of liquid sensing unit 12 |
| 70 | upper leg of L-shaped pivot member 68 |
| 72 | cut-out seat on upper leg 70 |
| 74 | movable arm of liquid sensing unit 12 |
| 76 | lower leg of L-shaped pivot member 66 |
| 78 | elongated pi member of liquid sensing unit 12 |
| 80 | sleeve of liquid sensing unit 12 |
| 82 | toilet paper band of liquid sensing unit 12 |
| 84 | lever arm of liquid sensing unit 12 |
| 86 | first end of lever arm 84 |
| 88 | second end of lever arm 84 |
| 90 | elongated pole for lever arm 84 |
| 92 | reduced area on elongated pole 90 |

DETAILED DESCRIPTION OF THE PREFERRED EMBODIMENT

Referring now to the figures, in which like numerals indicate like parts, and particularly to FIGS. 1 through 5, which are a diagrammatic perspective view of an embodiment of the present invention is use illustrating the cooperation among the components; a diagrammatic perspective view of the liquid sensing unit per se of the present invention, with the front cover exploded therefrom; a diagrammatic front elevational view taken in the direction of arrow 3 in FIG. 2 with the front cover removed; a diagrammatic cross-sectional view taken on line 4-4 of FIG. 3 with the front cover installed thereon; and a diagrammatic perspective view of the lever arm of the liquid sensing unit, and as such, will be discussed with reference thereto.

The present invention, as shown in FIG. 1, is a mechanical emergency liquid shut-off device 10 which comprises a liquid sensing unit 12 placed upon a floor 14 of a room 16. A pair of pulley assemblies 18 are mounted in a spaced apart relationship to a ceiling 20 of the room 16. A liquid flow pipe 22 having a shut-off valve 24 is located within the ceiling 20 of the room 16. A spool 26 has a shaft 28 rotatably connected to the shut-off valve 24 in the liquid flow pipe 22. A first cable 30 has a first end 32 coupled to the liquid sensing unit 12, wherein the first cable 30 extends through the pulley assemblies 18. A second cable 34 has a first end 36 wound upon the spool 26, wherein the second cable 34 extends through the pulley assemblies 18. A ballast weight 38 has a second end 40 of the first cable 30 and a second end 42 of the second cable 34 affixed thereto. When the liquid sensing unit 12 detects liquid coming into the room 16 from a leak in the liquid flow pipe 22, it will allow the first cable 30 to move about the pulley assemblies 18 making the ballast weight 38 drop down and pull the second cable 34 causing the first end 36 of the second cable 34 on the spool 26 to unwind rotating the spool 26 and the shaft 28, thereby closing the shut-off valve 24 and stopping the liquid leak in the liquid flow pipe 22.

The liquid sensing unit 12, as best seen in FIGS. 2, 3 and 4, comprises a box-shaped housing 44. A front cover 46 has a lower liquid receiving slot 48 therethrough and is removably attached to the box-shaped housing 44. When the front cover 46 is removed a person can gain access into the box-shaped housing 44. A plurality of feet 50 are mounted to the underside of box-shaped housing 44 to slightly elevate the box-shaped housing 44 from the floor 14 of the room 16.

The box-shaped housing 44 comprises a bottom wall 52 having a front rectangular opening 54 therethrough. A pair of side walls 56, 58 extend upwardly from the bottom wall 52. The first side wall 56 has an aperture 60 therethrough. A back wall 62 has a lower liquid receiving slot 54 therethrough and extends upwardly from the bottom wall 52. A top wall 66 is connected to the side walls 56, 58 and the back wall 62.

The liquid sensing unit 12 further comprises an L-shaped pivot member 68 pivotally mounted to the second side wall 58, wherein an upper leg 70 of the L-shaped pivot member 68 has a cut-out seat 72 therein. A movable arm 74 is mounted to a lower leg 76 of the L-shaped pivot member 68. An elongated pin member 76 which removably extends through the bottom wall 52 between the pair of side walls 56, 58. A sleeve 80 fits onto the elongated pin member 78 in the front rectangular opening 54 in the bottom wall 52. A toilet paper band 82 is biased under tension between the movable arm 74 and the sleeve 80. A lever arm 84 is inserted into the aperture 60 in the first side wall 56 of the box-shaped housing 44 with a first end 86 of the lever arm 84 resting in the cut-out seat 72 in the upper leg 70 of the L-shaped pivot member 68. The first end 32 of the first cable 30 is coupled to a second end 82 of the lever arm 84 extending outwardly away from the first side wall 56. When the toilet paper band 82 becomes saturated with leaking liquid it loses its strength to allow the biasing force to break the toilet paper band 82 and make the L-shaped pivot member 68 pivot, thus causing the first cable 30 to lift the lever arm 84 and drop the ballast weight 38 to close the shut-off valve 24.

The lever arm 84, as best seen in FIG. 5, comprises an elongated pole 90 having a series of spaced apart reduced areas 92 at the second end 88. The first end 32 of the first cable 30 can be adjustably coupled to one of the reduced areas 92 on the second end 88.

It will be understood that each of the elements described above, or two or more together, may also find a useful application in other types of constructions differing from the types described above.

While the invention has been illustrated and described as embodiments of a mechanical emergency liquid shut-off device, accordingly it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A mechanical emergency liquid shut-off device which comprises:
    a) a liquid sensing unit placed upon a floor of a room;
    b) a pair of pulley assemblies mounted in a spaced apart relationship to a ceiling of the room;
    c) a liquid flow pipe having a shut-off valve located within the ceiling of the room;
    d) a spool having a shaft rotatably connected to said shut-off valve in said liquid flow pipe;
    e) a first cable having a first end coupled to said liquid sensing unit, wherein said first cable extends through said pulley assemblies;
    f) a second cable having a first end wound upon said spool, wherein said second cable extends through said pulley assemblies; and
    g) a ballast weight having a second end of said first cable and a second end of said second cable affixed thereto, wherein when said liquid sensing unit detects liquid coming into the room from a leak in said liquid flow pipe, it will allow said first cable to move about said pulley assemblies making said ballast weight drop down and pull said second cable causing said first end of said second cable on said spool to unwind rotating said spool and said shaft, thereby closing said shut-off valve and stop the liquid leak in said liquid flow pipe.

2. The shut-off device as recited in claim 1, wherein said liquid sensing unit comprises:
    a) a box-shaped housing;
    b) a front cover having a lower liquid receiving slot therethrough and is removably attached to said box-shaped housing; wherein when said front cover is removed a person can gain access into said box-shaped housing; and
    c) a plurality of feet mounted to underside of said box-shaped housing to slightly elevate said box-shaped housing from the floor of the room.

3. The shut-off device as recited in claim 2, wherein said box-shaped housing comprises:
    a) a bottom wall having a front rectangular opening therethrough;
    b) a pair of side walls extending upwardly from said bottom wall, wherein said first side wall has an aperture therethrough;
    c) a back wall having a lower liquid receiving slot therethrough extending upwardly from said bottom wall; and
    d) a top wall connected to said side walls and said back wall.

4. The shut-off device as recited in claim 3, wherein said liquid sensing unit further comprises:
    a) an L-shaped pivot member pivotally mounted to said second side wall, wherein an upper leg of said L-shaped pivot member has a cut-out seat therein;

b) a movable arm mounted to a lower leg of said L-shaped pivot member;
c) an elongated pin member which removably extends through said bottom wall between said pair of side walls;
d) a sleeve which fits onto said elongated pin member in said front rectangular opening in said bottom wall;
e) a toilet paper band biased under tension between said movable arm and said sleeve; and
f) a lever arm inserted into said aperture in said first side wall of said box-shaped housing with a first end of said lever arm resting in said cut-out seat in said upper leg of said L-shaped pivot member, while said first end of said first cable is coupled to a second end of said lever arm extending outwardly away from said first side wall, wherein when said toilet paper band becomes saturated with leaking liquid it loses its strength allow the biasing force to break said toilet paper band and make said L-shaped pivot member pivot, thus causing said first cable to lift said lever arm and drop said ballast weight to close said shut-off valve.

5. The shut-off device as recited in claim 4, wherein said lever arm comprises an elongated pole having a series of spaced apart reduced areas at said second end, wherein said first end of said first cable can be adjustably coupled to one of said reduced areas on said second end.

* * * * *